(12) United States Patent
Haraguchi et al.

(10) Patent No.: US 6,222,613 B1
(45) Date of Patent: *Apr. 24, 2001

(54) IMAGE PROCESSING METHOD AND APPARATUS

(75) Inventors: Tsuyoshi Haraguchi; Shouichi Nomura; Yoshiaki Yamanaka, all of Hino (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,855

(22) Filed: Feb. 9, 1999

(30) Foreign Application Priority Data

Feb. 10, 1998 (JP) .................................. 10-044317

(51) Int. Cl.[7] .................................. G03B 27/52
(52) U.S. Cl. .......................... 355/40; 358/451; 358/487; 358/527; 382/298
(58) Field of Search ...................... 355/38, 40; 358/487, 358/506, 451, 527, 530, 537; 348/96, 97; 382/298

(56) References Cited

U.S. PATENT DOCUMENTS

| 5,235,434 | * | 8/1993 | Wober | 358/448 |
| 5,337,130 | * | 8/1994 | Satoh | 355/77 |
| 5,757,471 | * | 5/1998 | Itoh et al. | 355/71 |
| 5,949,551 | * | 9/1999 | Miller et al. | 358/408 |

* cited by examiner

Primary Examiner—Safet Metjahic
Assistant Examiner—Etienne LeRoux
(74) Attorney, Agent, or Firm—Finnegan, Henderson, Farabow, Garrett, & Dunner, L.L.P.

(57) ABSTRACT

A method and apparatus for processing image information coming from various types of image inputting media yields an image processor for processing image information that consolidates image size irrespective of the type of image inputting medium. The apparatus is provided with a plurality of image inputting media, each of which inputs image information as a first image information having a fixed image size. An image size converter converts the fixed image size to a predetermined image size which is a constant image size independent of both the fixed image size and the type of image inputting medium that inputs the first image information. The conversion generates a second image information and a data generator generates conditional data for processing the second image information. An image processor processes the second image information using predetermined image processing procedures, based on the conditional data, to generate a third image information.

19 Claims, 7 Drawing Sheets

IMAGE PROCESSING METHOD AND APPARATUS

BACKGROUND OF THE INVENTION

The present invention relates to an image processing method and an image processing apparatus.

With the popularization of digital printers producing prints on the basis of image information, opportunities of handling images incoming from various types of image inputting media and/or devices have proliferated. As an example, when the prints are produced by image information originating from various types of digital camera, a signal conversion technique in the predetermined color domain, which is standardized on the basis of subject intensity at the camera, is typically applied to the image information originating from the digital camera, in order to homogenize the image quality.

In reality, however, the accuracy of conversion into the predetermined color domain and an optical systems for capturing images have varied with various sorts of digital cameras. Owing to this fact, it has not been a simple task to homogenize the image quality, even if the predetermined color domain is standardized at the camera side.

In addition, with the increase of memory capacity for storing image information in digital cameras, the number of images, taken by the digital camera, have also increased. Therefore, in order to produce prints with the image information incoming from various types of digital cameras, it is required to rapidly determine the conditions necessary for image processings, corresponding to many image information. Development of such a method and an appropriate apparatus has been an urgent task in this field.

In addition to digital cameras, digital images incoming from various types of image inputting media have different image sizes (defined as vertical and lateral pixel number of image information). For example, in the case of print production based on an image information, an exclusive image processing system, which corresponds to the type of the image information, is required for adjusting the color/density. This fact has resulted in complexity of the processing system.

In a system called "Digital Mini-Lab.", specifically comprising a film scanner, a print production process, wherein various kinds of image processings such as a color compensation, etc. are performed on the basis of the image information obtained from the film scanner, has been established. It has been an urgent goal for such a "Digital Mini-Lab." to have a function of corresponding to various types of digital images without adding to the operator's work load.

In a printing system for producing prints from various kinds of photo documents, a system for automatically adjusting the print quality has been adopted to reduce the operator's work load for the additional quality manipulations. There have been drawbacks, however, such that finished print quality is not neccessary sufficiently good, e.g., a print of rear-lighting image being finished with too much dense tone, etc. Although it has been expected to introduce a system for automatically adjusting the print quality in the field of digital media such as digital cameras, etc. to reduce the operator's work load, such a system has not been realized so far. Further, in the system of "Digital Mini-Lab." wherein simultaneous print processing of plural prints gathered from the media mentioned above is possible, it is desirable that the automatic adjusting system should have the capability of always finishing prints with constant image quality irrespectve of media type, as well as stable print quality of each medium. So far, however, such a system does not yet exist.

SUMMARY OF THE INVENTION

The primary objective of the present invention is to provide an image processing method and an apparatus for processing the image information incoming from various kinds of image inputting media, wherein a homogenization processing of image quality and a synthetic image processing are performed in a common system.

In order to minimize the aforesaid problems and to achieve the abovementioned objective, the present invention includes such an image processing method and image processing apparatus, described as follows:

1) an image processing method, comprising the steps of:
    inputting the first image information;
    converting the first image information into a predetermined image size to generate the second image information; and
    applying image processing to the first image information or the second image information, on the basis of the second image information, to generate the third image information, 2) an image processing method, comprising the steps of:
    inputting the first image information;
    converting the first image information into a predetermined image size to generate the second image information; and
    generating an image processing conditions for the image processings on the basis of the second image information, 3) an image processing apparatus, comprising:
    means for inputting the first image information;
    an image size converter to convert the first image information to the second image information having a predetermined image size; and
    means for applying a image processing to the first image information or the second image information, on the basis of the second image information, to generate the third image information, and 4) an image processing apparatus, comprising:
    means for inputting the first image information;
    an image size converter to convert the first image information to the second image information having a predetermined image size;
    means for generating image processing conditions for the image processing on the basis of the second image information.

In the present invention, the inputting means is defined as means for inputting image information which is equivalent to image signals representing images, which includes electric signals, optical signals, magnetic signals, etc. The inputting means includes CD-ROM, Floppy Disk Drive, Magnet-optics Disk Drive, means for reading data from media such as Hard Disk, etc., means for receiving image information via communication lines, a scanner for reading images recorded on documents, etc.

The term of "fixed size" defined in the present invention designates a size being in a range of ±35% of the predetermined image size.

It is desirable that the predetermined image size is set at a larger size than the fixed image size having a large number of pixels sufficient to discriminate a main subject (such as a human figure, a plant, a building, etc.) existing in an image. On the contrary, it is also desirable that the predetermined image size is set at a smaller size than the fixed image size having a small number of pixels sufficient to eliminate details of microstructure which are irrelevant to the main subject, e.g., granules existing in silver-halide photos.

Accordingly, in the image (color/density) processing described later, it is possible to obtain characteristic values pertaining to the main subject in the image and stable processing results with little influence of various visual noise which is irrelevant to the main structural element in the image.

In addition, when image printing is performed on the basis of the third image information, the larger the finished print size, the smaller the region which can be recognized as the main structural element. Although an appropriate image size of the second image information is apt to be getting large accordingly, it is not so much change as is the difference of the print size. Therefore, it may be appropriate that the image size of the second image information is predetermined in a range of 190–500 pixels in the longitudinal dimension of the image.

Now, the image processing methods and the image processing apparatus related to the present invention will be described in detail, item by item as follows. (1) After inputting image information from plural kinds of image inputting media, the first image information, which is input so as to have the same image size, irrespective of the kinds of image inputting media, is converted to the second image information by a resolution conversion method. Then, image processing is performed on the basis of the second image information.

According to the method described above, since the same image size is obtained by applying the resolution conversion to the image information with various image sizes, it becomes possible to commonly use the image processing process thereafter and to enlarge the applicable range of the image processing without increasing the complexity of the processing system. (2) After image processing conditions are determined on the basis of the second image information mentioned above, new image information is obtained by converting the first image information under the image processing conditions mentioned above.

According to the method described above, it becomes possible to use a common processing process such as an arithmetic image operation to derive the image processing conditions for homogenizing image quality of the image information incoming from various types of image inputting media. The image inputting media defined in the present invention are various kinds of recording media including CD-ROM, Floppy Disk, Magnet-optics Disk, Hard Disk, etc., and also including media which store image information in main body of the camera such as digital cameras, digital video cameras, etc. (3) A film scanner section for reading the image information from the photo film is provided, wherein the image information has the same image size as that of the second image information mentioned above.

According to the method described above, it becomes possible to apply image processings in the same processing system to image information read from a negative color transparent film or a positive color transparent film or a monochrome transparent film, or incoming from various kinds of digital cameras or media. Then, it also becomes possible to use a common system for such processings as an arithmetic operation to compensate for image information, image synthetic processing, image displaying processing, etc. (4) After determining the image processing conditions on the basis of the low resolution image information obtained from the film scanner, new image information is obtained by converting the image information at a higher resolution on the basis of the image processing conditions mentioned above, wherein the low resolution image information has the same image size as that of the second image information mentioned above.

According to the method described above, since the lower resolution image information is utilized for determining the image processing conditions, it becomes possible to increase the velocity of the arithmetic image processing, etc., and to perform image compensation for various kinds of image information in the same processing system. Thus, any desired image quality will be quite easier to obtain. (5) The image processing conditions mentioned above are compensating conditions for color and/or density.

According to the method described above, color and/or density compensating processing makes it possible to homogenize the color of various digital images incoming from different types of digital cameras, as well as other devices. (6) The image processing based on the second image information is an image synthesizing processing of a plurality of the second image information for a plurality of predetermined domains.

According to the method described above, since the image synthesizing processing systems for displaying plural image frames and for producing an index print can be utilized in common, it becomes possible to simplify the total image processing system. (7) In order to adjust the image size at the same, an additional portion of the image information can be attached in either the vertical or the horizontal direction to either the image information incoming from the film scanner or the second image information.

According to the method described above, since a common image synthesizing processing systems can be utilized for the image information with different aspect ratios without deformation or dropping of image portions when displaying images or producing index prints, it becomes possible to simplify the total image processing system. (8) The first image information mentioned above is image information obtained from digital cameras.

According to the method described above, it becomes possible to flexibly cope with the forthcoming popularization of high resolution images of digital cameras, and the effects of the present invention will become more marked. (9) The resolution of the second image information is lower than that of the first image information mentioned above.

According to the method described above, since the processing rate of image processing section common to various digital images can be increased, it becomes possible to improve the processing rate of the total image processing system. (10) After inputting image information from plural kinds of digital cameras, the new image information are obtained by applying the image processing to the inputted first image information under the image processing conditions for use of digital cameras, which are predetermined and stored beforehand.

According to the method described above, since the image processing conditions for digital camera use can also be applied for the inputted first image information, it becomes possible to shorten the processing time for the first image information and to improve the processing rate of the total image processing system. (11) Prints are produced by exposing photosensitive material on the basis of the image information obtained by using one of the methods described above.

According to the method described above, since the image processing processes from inputting various kinds of image information to printing can be communized and image quality can be homogenized, it becomes possible to produce prints with high image quality from various kinds of digital image information in a simplified processing system. (12) An image processing apparatus comprises means for converting the image resolution and means for image processing, wherein after inputting image information from plural kinds of image inputting media, the first image information, which is input so as to have the same image size, irrespective of the kinds of image inputting media, is converted to the second image information by the image resolution converting means, and then, image processing is performed by the image processing means on the basis of the second image information.

According to the apparatus described above, since the same image size is obtained by applying the resolution conversion to the image information with various image sizes, it becomes possible to use a common image processing process thereafter and to enlarge the applicable range of the image processing apparatus without increasing the complexity of the processing system. (13) The image processing apparatus further comprises means for determining image processing conditions on the basis of the second image information mentioned above, and means for obtaining a new image information by converting the first image information under the image processing conditions mentioned above.

According to the apparatus described above, it becomes possible to use common processing processes such as the arithmetic image operation to derive the image processing conditions for homogenizing image quality of the image information incoming from various types of image inputting media. The image inputting media defined in the present invention are various kinds of recording media including CD-ROM, Floppy Disk, Magnet-optics Disk, Hard Disk, etc., and also including media which store image information in the main body of cameras such as digital cameras, digital video cameras, etc. (14) The image processing apparatus further comprises a film scanner for reading the image information from the photo film, wherein the image resolution converting means converts the image information read by the film scanner into the same image size as that of the second image information mentioned above.

According to the apparatus described above, it becomes possible to apply image processings in the same processing system to image information read from a negative color transparent film or a positive color transparent film or a monochrome transparent film, or incoming from various kinds of digital cameras or media. Then, it also becomes possible to use a common system for such processing as an arithmetic operation to compensate the image information, image synthetic processing, image displaying processing, etc. (15) The image processing apparatus comprises means for generating new image information, wherein after determining the image processing conditions on the basis of the low resolution image information obtained from the film scanner, new image information is generated by converting the image information with higher resolution on the basis of the image processing conditions mentioned above, and the low resolution image information has the same image size as that of the second image information mentioned above.

According to the apparatus described above, since the lower resolution image information is utilized for determining the image processing conditions, it becomes possible to increase the velocity of the arithmetic image processing, etc., and to perform an image compensation for various kinds of image information in the same processing system. Thus, any desired image quality will be quite easier to obtain. (16) The image processing apparatus includes compensating conditions for color and/or density in regard to the image processing conditions mentioned above.

According to the apparatus described above, color and/or density compensating processing make it possible to homogenize the color of various digital images incoming from different types of digital cameras, as well as other devices. (17) The image processing apparatus comprises means for image synthesizing processing, wherein the image processing based on the second image information is an image synthesizing processing for a plurality of the second image information for a plurality of the predetermined domains.

According to the apparatus described above, since the image synthesizing processing systems for displaying plural image frames and for producing an index print can be utilized in common, it becomes possible to simplify the total image processing system. (18) The image processing apparatus comprises means for attaching an additional portion of the image information in either vertical or horizontal direction to either the image information incoming from the film scanner or the second image information, in order to adjust the image size at the same size.

According to the apparatus described above, since a common image synthesizing processing system can be utilized for the image information with different aspect ratios without deformation or dropping of image portions when displaying images or producing index prints, it becomes possible to simplify the total image processing system. (19) The image processing apparatus has a feature in which the first image information mentioned above is the image information obtained from digital cameras.

According to the apparatus described above, it becomes possible to flexibly cope with the forthcoming popularization of high resolution images of digital cameras, and the desirable effects of the present invention will become more marked. (20) The image processing apparatus has a feature such that the resolution of the second image information is lower than that of the first image information mentioned above.

According to the apparatus described above, since the processing rate of image processing section common with the various digital images can be increased, it becomes possible to improve the processing rate of the total image processing system. (21) The image processing apparatus comprises means for inputting image information from plural kinds of digital cameras and memory means for storing the image processing conditions for digital camera use, which are predetermined and stored beforehand, wherein after inputting the image information, the new image information are obtained by applying the image processing to the inputted first image information under the image processing conditions.

According to the apparatus described above, since the image processing conditions for digital camera can be applied for the inputted first image information, it becomes possible to shorten the processing time for the first image information and to improve the processing rate of the total image processing system. (22) The print producing apparatus has a function of producing prints by exposing a photosensitive material on the basis of the image information obtained by using one of the apparatus described above.

According to the apparatus described above, since the image processing processes from inputting various kinds of image information to printing can be communized and image quality can be homogenized, it becomes possible to produce prints with high image quality from various kinds of digital image information in a simplified processing system.

BRIEF DESCRIPTION OF THE DRAWINGS

Other objectives and advantages of the present invention will become apparent upon reading the following detailed description and upon reference to the drawings in which.

DESCRIPTION OF THE PREFERRED EMBODIMENT

Figure 1:
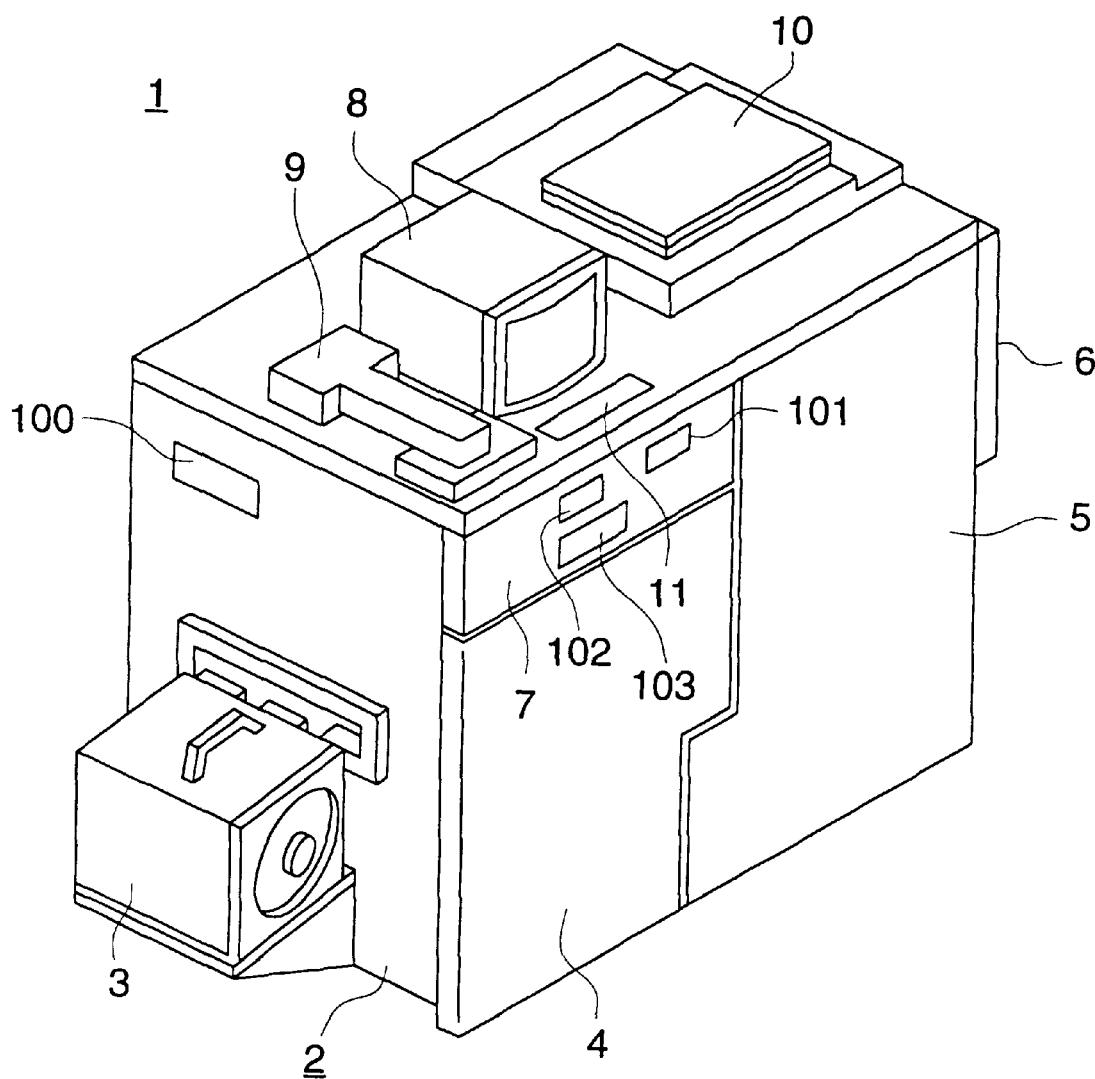
FIG. 1 shows a diagonal perspective view of the print producing apparatus utilizing apparatus and methods of the image processing, embodied in the present invention.

In the following, apparatus and methods of the image processing, embodied in the present invention, will be described, referring to the drawings.

FIG. 1 shows a perspective view of a print producing apparatus utilizing apparatus and methods of the image processing embodied in the present invention.

A print producing apparatus 1 incorporates a magazine loading section 3 mounted on the left side of a main body 2, an exposure processing section provided in the main body 2 to expose images on photosensitive materials, and a development processing section 5 to produce the prints by developing the exposed photosensitive materials and drying them. The finished prints are delivered to a delivery tray 6 mounted on the right side of the main body 2. In addition, a control section 7 is also incorporated in the main body 2, and located at the upper portion of an exposure processing section 4.

Further, a CRT 8 is mounted on the top of the main body 2. A film scanner section 9 which reads image data of a transparent original film, and an inputting device 10 which reads image data of a reflective original sheet, are arranged at left and right sides of the CRT 8, respectively.

Figure 2:
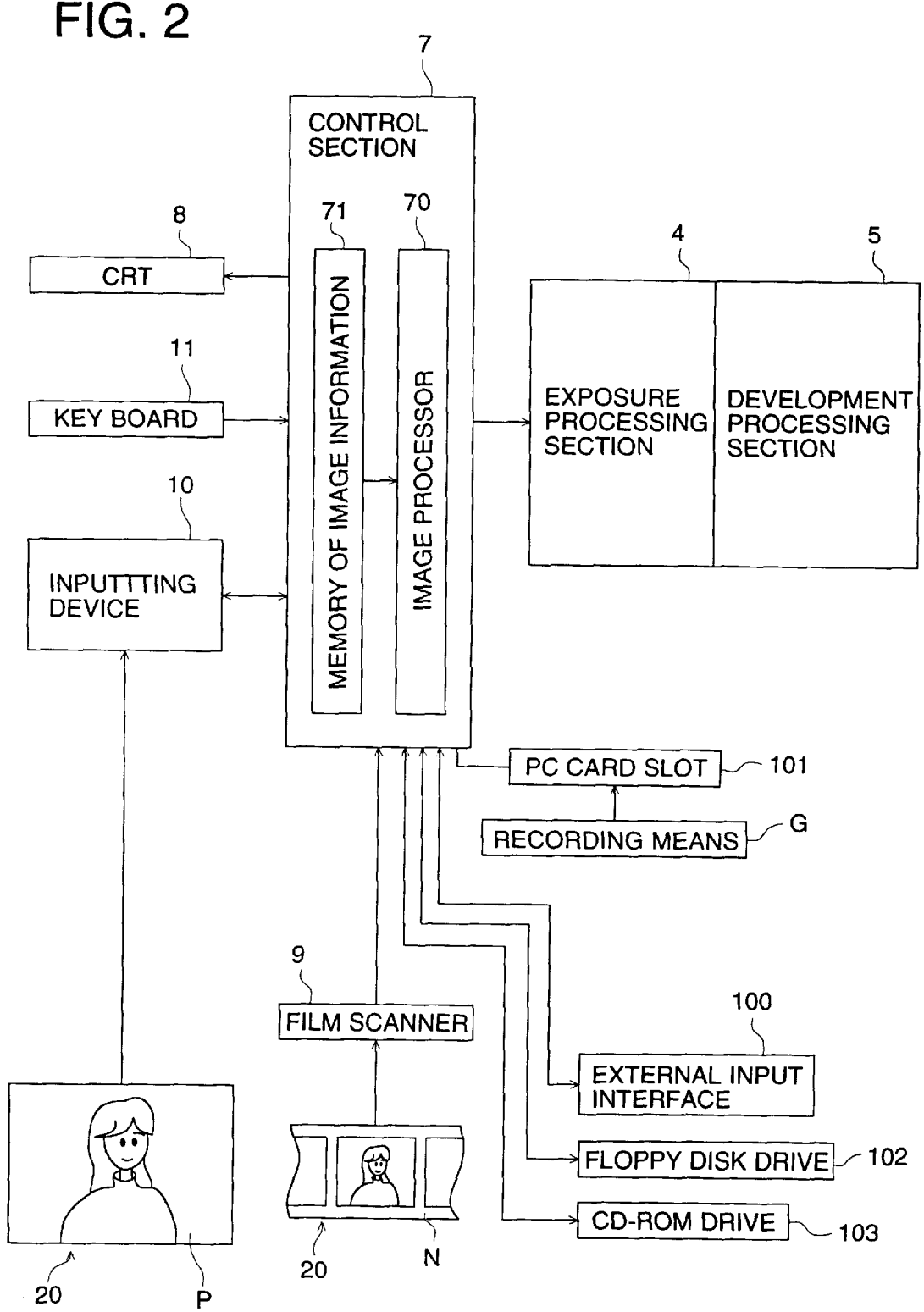
FIG. 2 shows a schematic diagram of the print producing apparatus.

FIG. 2 shows substantial schematic structural diagram of a print producing apparatus.

On the basis of instructions inputted by a key board 11, the control section 7 of the print producing apparatus 1 carries out such processing as reading image data incoming from a film scanner section 9 or from a reflection type original image inputting device 10 (hereinafter, referred to as the inputting device 10, for simplicity), reading image data incoming from a digital camera or a digital video camera through an external input interface 100 or a PC card slot 101, reading image data incoming from various recording media by means of a floppy disk drive 102 or a CD-ROM drive 103, storing the image data in an image information memory 71, and displaying images on the CRT 8, or producing prints.

The film scanner section 9 and the inputting device 10, serving as image reading means, are provided for obtaining image data of the pictorial image developed on the silver-halide photosensitive material. Image data of an original 20 such as a negative color transparent film, a positive color transparent film, or a monochrome transparent original can be read by means of the film scanner section 9. While image data of an original 20 such as a print P, which is produced through exposure and development processing of a film image, can be read by means of the inputting device 10.

The PC card slot 101, serving as a inputting means of image data incoming from various types of digital cameras, is provided for setting a recording media G in it to read the image data stored in the recording media G in which image data of various types of digital cameras are already stored. While, image data of various types of digital cameras also can be inputted through the external input interface 100 by means of the serial data transmission features.

In the image processor 70, image data utilized for the exposing process are generated by processing the inputted image data, and are transmitted to the exposure processing section 4 wherein the images are exposed on photosensitive materials. The exposed photosensitive materials are sent to the development processing section 5 to produce the prints through the processes of developing and then drying them.

Figure 3:
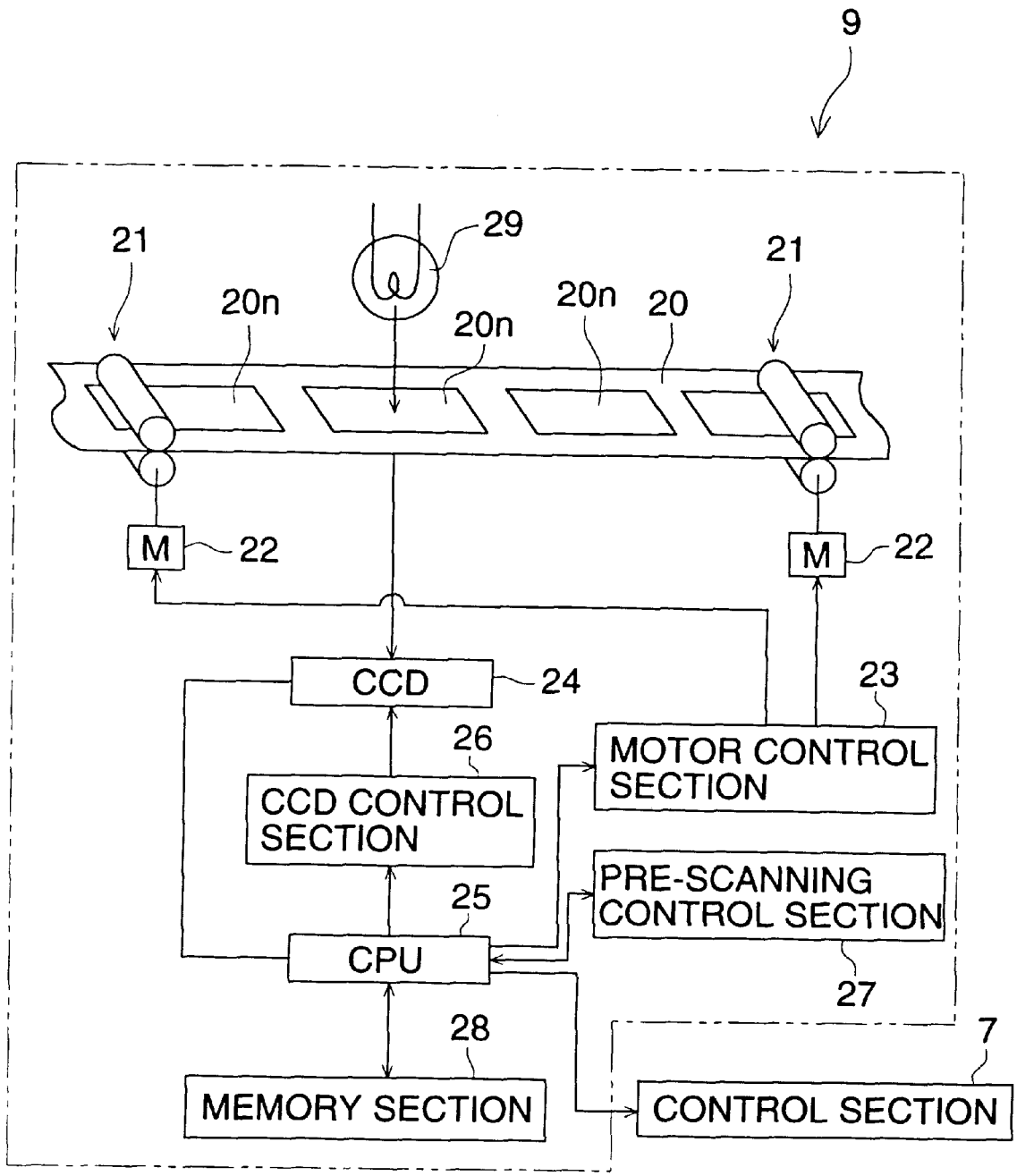
FIG. 3 shows a schematic diagram of the film scanner section.

FIG. 3 shows the main configurations of the film scanning section.

In the film scanner section 9, it is possible to read the image data of the original 20 such as a negative color transparent material, a positive color transparent material, or a monochrome transparent material. The film type original 20 is conveyed by paired rollers 21 which are driven by a motor 22 controlled by a motor control section 23. When a light source 29 emits a light, the light penetrating through the original 20 is received by a CCD 24, and the image signals converted by the CCD 24 are transmitted to a CPU 25 which controls the CCD 24. The CPU 25 also carries out such processing as controlling a pre-scanning control section 27 to perform pre-scanning, storing the pre-scanning information into a memory section 28, calculating processing based on the pre-scanning image data, and transmitting compensated values, utilized for image data compensation in the main scanning process, to the control section 7.

Figure 4:
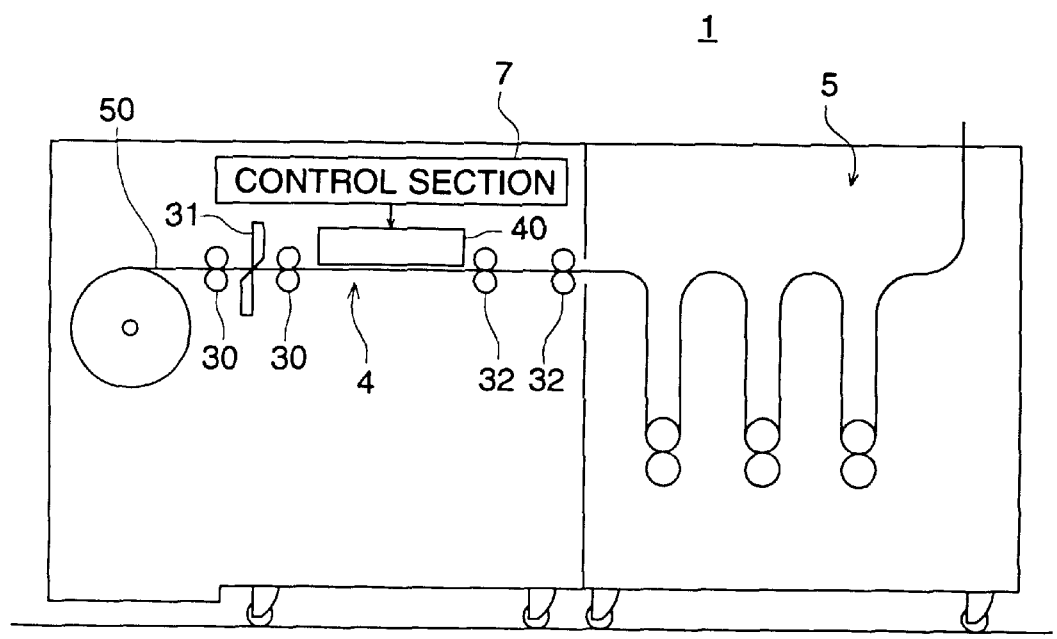
FIG. 4 shows a schematic diagram of the print producing apparatus.

FIG. 4 shows the essential configurations of the print producing apparatus.

In the print producing apparatus 1, a photosensitive material 50 is fed by paired conveyance rollers 30 and is cut to predetermined length by means of a cutter 31. This photosensitive material is conveyed to the exposure processing section 4 wherein the emulsion coated surface of the photosensitive material is exposed by means of an exposing head 40 under conditions of exposure compensation for the photosensitive material, and is then recorded. After exposing, the photosensitive material is further conveyed to the development processing section 5 by means of paired conveyance rollers 32.

Alternatively, it is also possible to employ laser scanning exposure for the abovementioned image recording, instead of the exposing head 40. For instance, three lasers, each of which corresponds to one of the three primary color layers (e.g. R, G and B) formed on the photosensitive material, are provided for two dimensional scanning by laser lights modulated in accordance with the image data. Specifically, image recording onto the photosensitive material is achieved by deflecting the modulated laser beams in the main scanning direction while conveying the photosensitive material in the sub-scanning direction, basically perpendicular to the main scanning direction.

In an image processing section 70 of the control section 7, the compensated image data are generated by applying image processings to the image data incoming from various sections, such as, the film scanning section 9, the inputting device 10, means for reading the recording media, or digital camera etc. through the external interface 100. In regard to the recording media, it is possible to employ such recording media, which are capable of storing image data and being read by computer, as, e.g., PC card, floppy disk and CD-ROM.

The image processing section 70 comprises means for applying a resolution converting processing, serving as an image size conversion processing, to the first image data incoming from the PC card slot 101, the external interface 100, the floppy disk drive 103, or the CD-ROM drive to generate the second image data having the predetermined image size, and means for conducting image processing on the basis of image processing conditions, which are correlatively derived from the second image data, to generate new image data. In this case, the abovementioned image processing would be applied to the first image information, the second image information or an image information which is different in image size from the first and the second image information. For example, as a normal application, the abovementioned image processing is applied to the first image information, and the generated image data are transferred to the exposure processing section 4 to produce a print thereby. In addition, it is also possible to apply the abovementioned image processing to the second image information to produce an index print. Therefore, the image processing section 70 will make it possible to generate new image data with homogeneous image quality by converting the first image data incoming from various kinds of digital cameras into the second image data having a image size different from that of the first image data, and by conducting the image processings on the basis of image processing conditions in accordance with the second image data.

In order to generate the second image data by means of the resolution converting processing, serving as an image size conversion processing, the image expansion/reduction techniques, such as pixel supplement/thinning processing, etc., are available. In addition, if image information in file formatted image data, including images with a plurality of resolutions, selector means for selecting image data with a predetermined resolution is also available.

The image information from digital cameras, defined in the present invention, includes single frame image information from digital video cameras.

Further, the film scanning section 9 is provided for reading image data from transmission original materials such as negative films, positive films, etc., and those image data have the predetermined image size same as that of the second image data derived from various kinds of digital cameras. The image processing is carried out under image processing conditions corresponding to each kind of image data. While, in case of reflection type documents, the image data of which are read by the inputting device 10, the image processing is carried out under image processing conditions which are correlatively derived from an image data having the predetermined image size same as that of the second image data or that of the pre-scanning image data.

As described above, it is possible to apply image processing in the same processing system to image data read from a negative color transparent film, a positive color transparent film, a monochrome transparent film or a reflection type document, or incoming from various kinds of digital cameras or media.

Provided that the image processing conditions are color and/or density compensating conditions, it is also possible to homogenize the color and/or density properties included in digital image information coming from various kinds of digital cameras or media by compensating the color and/or density of them.

As described above, it is possible to input various kinds of digital image information, to homogenize the image quality, and to make prints with high image quality from various kinds of digital image information.

In regard to the compensation method of color and/or density, it is possible to calculate the average value of image information as a basic value of the compensation. For instance, when an average pixel value of an image information group is predetermined at R=G=B=128 for each color and the average pixel values of the second image information are, e.g., R=108, G=118, B=138, the shift values are calculated out as +20 for R, +10 for G, −10 for B. The compensation of the first image information is accomplished by shifting the average pixel value of the first image information on the basis of the calculated shift values.

Another technique for color compensation is set forth in Tokkaihei 9-261505, wherein an original color image is divided into a plurality of blocks and the calculation of the first statistic is carried out by subtracting the influence of the high chroma blocks from the original color image, and then the calculation of the second statistic is carried out on the basis of the first statistic by subtracting the influence of the high chroma pixels, and, finally, the color compensation value for the original color image is obtained from the second statistic. Still another technique for color compensation is set forth in Tokkaihei 9-294215, wherein a plurality of statistics being different one another are derived from chroma data of pixels of an original color image, and conditions for extracting the neutral pixels are derived from an statistic obtained from each of the plural statistics to extract the neutral pixels, which satisfy all of the derived extracting conditions, from the original color image, and a color image reproduction method based on the extracted neutral pixels makes it possible to perform a color compensation with little influence of the color failure.

Further, a technique for density compensation is set forth in Tokkaihei 5-93973, wherein the image characteristics of an original image are derived from the obtained image data, and the value of the derived image characteristics and/or the first order linear sum of the image characteristic value functions are utilized for evaluating the image characteristics of an original image. The desirable density compensation with little influence of the density failure can be achieved by such the method that the group to which the original image should be belonged is discriminated from a plurality of the predetermined groups on the basis of the evaluating results mentioned above and then the exposing amount or the exposing compensation amount for the original image is calculated out by using the predetermined regression function corresponding to the discriminated group.

Figure 5:
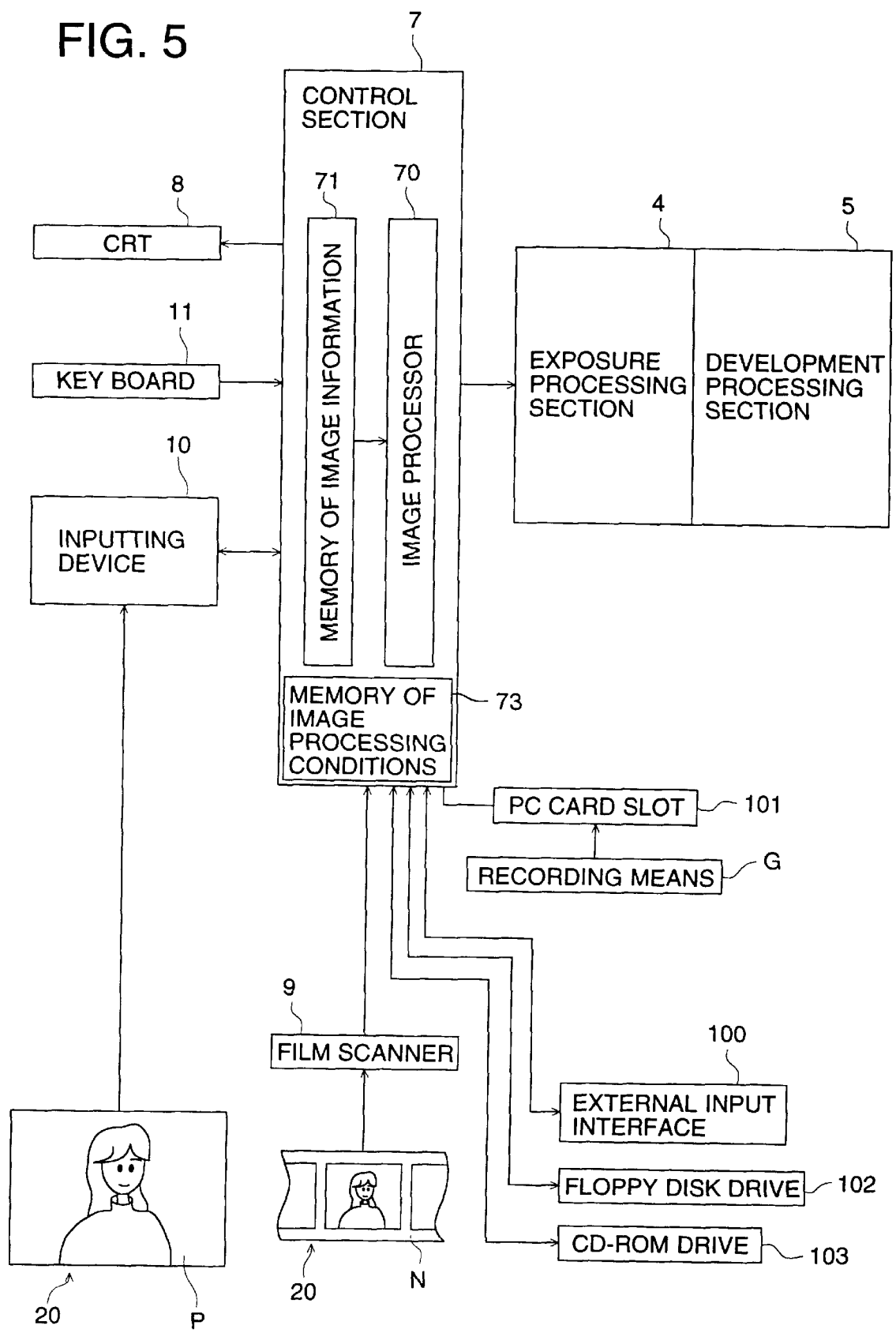
FIG. 5 shows a schematic diagram of the another embodiment of the print producing apparatus.

FIG. 5 shows another embodiment of the present invention, illustrating a simplified schematic diagram of the print producing apparatus.

An image processing conditions memory 73 (hereinafter referred to as the conditions memory 73, for simplicity) for storing image processing conditions, which are predetermined for each type of digital camera, is included in the control section 7 of the print producing apparatus 1. In the image processing section 70, the image processing of the in coming first image information are carried out on the basis of image processing conditions stored in the conditions memory 73 to send the revised image data to the exposure processing section 4. In the exposure processing section 4, a photosensitive material is exposed to image data, then the photosensitive material is sent to the development processing section 5 where the exposed photosensitive material is developed, then, processed and dried, and thus a print is made. Accordingly, it becomes possible to homogenize the image quality of the image information incoming from various digital cameras, resulting in a production of prints with homogenized image quality.

The image processing conditions stored in the conditions memory 73 includes, e.g., the amount of color/density level shift, the amount of contrast conversion, color matrix coefficients for chromatic conversion, etc. Those values may be utilized for deriving the compensated image information from the original image information through a direct calculation process, or the image processing conditions may be utilized for setting the LUT by which the original image information is converted to the compensated image information. Other methods for correlating the image processing conditions with a sort of digital camera may include an automatic setting, wherein data pertaining to a sort of digital camera is attached to the original image data and is automatically read, as well as manual setting by the operator.

As mentioned above, it is possible to improve the processing speed of the first image information by employing the image processing conditions for each model of digital camera, which are already stored in the conditions memory 73.

Figure 6:
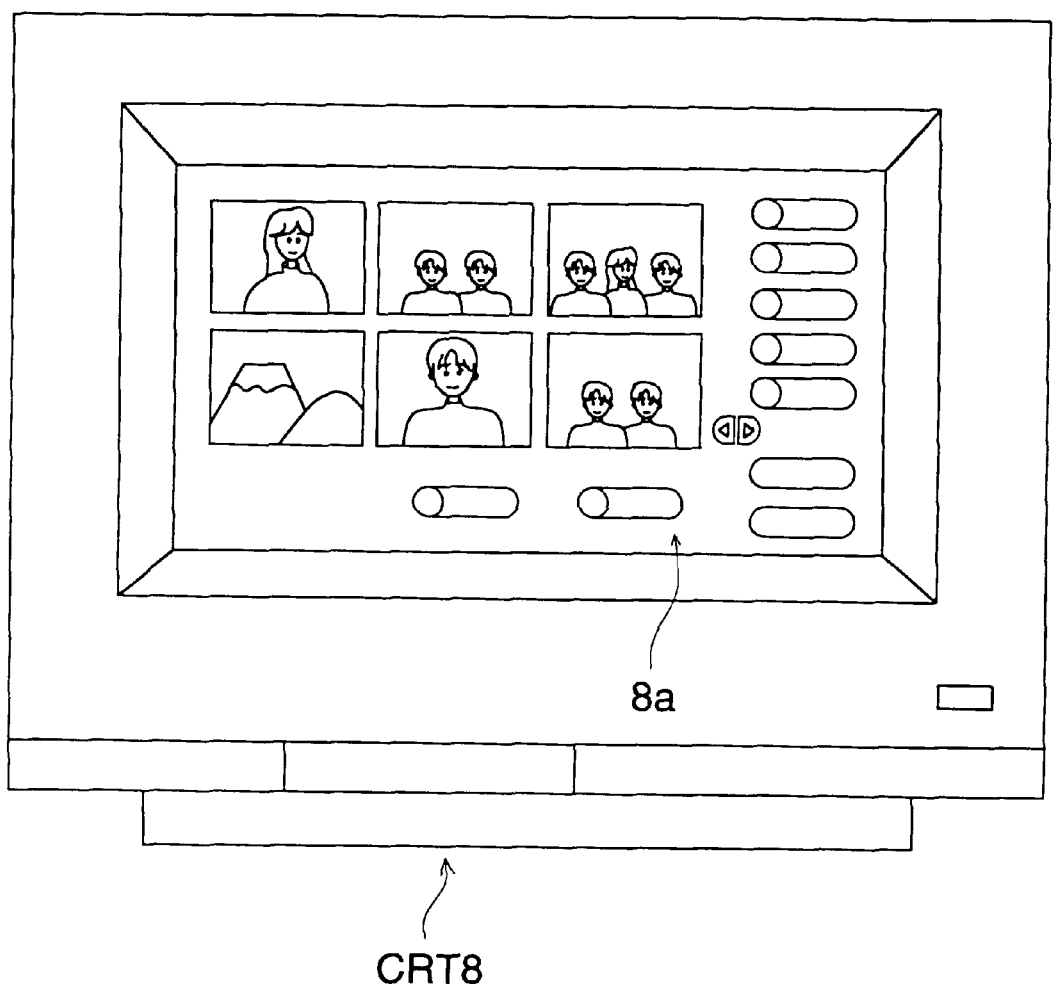
FIG. 6 shows an explanetory illustration when an operator manually adjusting color/density of the image with displaying images of 6 frames on the CRT.
Figure 7:
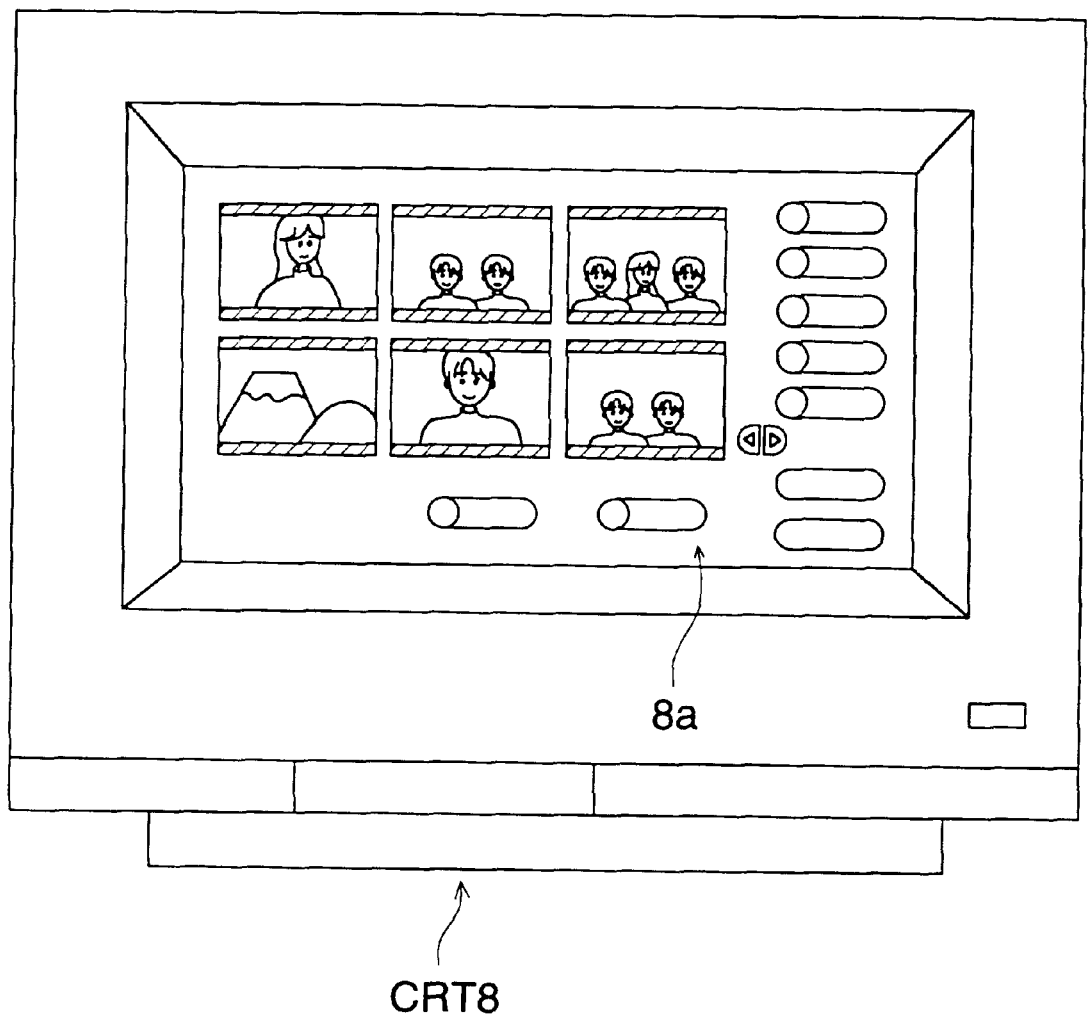
FIG. 7 shows another explanatory illustration when an operator manually adjusting color/density of the image with displaying images of 6 frames on the CRT.

Even if an operator manually adjusts color/density of 6 images displayed on the CRT 8 by operating a touch panel 8*a* and/or the keyboard 11 as shown FIG. 6 and FIG. 7, it is not neccessary for the operator to change the mode of the image display processing between the film data and the digital camera data, since the synthesized images displayed on the CRT 8 have the same frame size each other. This will simplify the processing system.

As shown in FIG. 7, when displaying the images of digital cameras, additional portions are vertically attached to each image displyed on the CRT 8, in order to adjust the aspect ratio of them to that of the film images. This image synthesizing processing can be employed, as well, for the production of the index print on which a plurality of images are arranged. In this case, there is no need to prepare various kinds of printing formats in accordance with the sort of incoming image data.

Next, a method of inputting image information from a film scanning section 9 and applying an image processing for it is explained.

A transmission type original is read at the film scanning section 9, whereby a preliminary-scanned image information (the second (the fourth) image information) is obtained. The image size of the preliminary-scanned image information is made as the expected image size as the same manner in the case that image information is read from the memory medium as stated above. Then, an image processing section 70 obtains an image processing condition such as a correcting condition for color and/or density on the basis of the preliminary-scanned image information. Also, the film scanning section 9 reads image information (main-scanned image information (the fifth image information)) having a different image size from that of the preliminary-scanned image information from a transmission type original. Here, it may be preferable that the above different image size is larger than that of the preliminary-scanned image information. Then, an image processing section 70 apples the image processing to the main-scanned image information in accordance with the obtained image processing condition.

In the above embodiment, the image processing is applied to the main-scanned image information. However, in the case that an index print is produced, it may be permissible that the image processing is applied to the preliminary-scanned image information.

Further, in the above embodiment, the example that the transmission type original is read again in order to obtain the main-scanned image information after the original is read in order to obtain the preliminary-scanned image information, is explained. However, it may be permissible that after the transmission type original is read in order to obtain the main-scanned image information, the processing to change the image size is applied to the main-scanned image information and the preliminary-scanned image information is obtained.

Now, a method of inputting image information from a reflection type original inputting device 10 and applying an image processing is explained.

A reflection type original is read by the reflection type original inputting device 10, whereby the first image information is obtained. It may be preferable that the image size of the first image information is larger than the expected image size. The processing to change the image size is applied to the first image information, whereby the second (the fourth) image information having the expected image size smaller than that of the first image information. The expected image size is the same size as the image size in the case that the image information is read from the memory medium or in the case that the image information is read from the film scanning section 9. Then, the image processing section 70 obtains an image processing condition such as a correcting condition for color and/or density on the basis of the second image information. Further, the reflection type original inputting device 10 reads the fifth image information having a different image size from those of the first image information and the second image information. Here, it may be preferable that the different image size of the fifth image information is larger than those of the first image information and the second image information. Then, the image processing section 70 apples the image processing to the fifth image information in accordance with the obtained image processing condition.

In the above embodiment, the image processing is applied to the fifth image information. However, in the case that an index print is produced, it may be permissible that the image processing is applied to the second image information or that the image processing is applied to the first image information.

Further, as same as the case that the transmission type original is read by the film scanning section 9, that the image processing condition is obtained, and that the image processing is applied, it may be permissible that the second image information of the expected image size is read from the reflection type original inputting device 10 without obtaining the first image information, the image processing condition is obtained on the basis of the second image information, the fifth image information is read from the reflection type original inputting device 10 at the time different from the time at which the second image information is read, and the image processing is applied to the fifth image information.

According to the present invention, since the image information which is necessary for automatic adjustment of printing quality can be obtained appropriately, it is possible to produce images with high quality and stability, irrespective of the type of media. In addition, if the image size is predetermined to the same size, it is possible to use a common image processing process thereafter, and as a result, it is possible to enlarge the applicable scope of the image processings without further complicating the processing system.

What is claimed is:

1. An apparatus for reproducing an image based on image data inputted from various types of media, comprising:
   an inputting section having various types of inputting devices, each of which inputs said image data as a first image data;
   a first image processor to generate a second image data from said first image data by converting an image size of said first image data into a predetermined image size of said second image data, wherein the image size of said first image data varies depending on types of said media, while said predetermined image size of said second image data is a constant image size being independent of the image size of said first image data and irrespective of types of said media;
   a data generator to generate conditional data for adjusting a quality of said image based on said second image data;
   a second image processor to generate a third image data by processing either said first image data or said second image data based on said conditional data generated by said data generator; and
   an image outputting device for outputting said image based on said third image data so as to represent said image in visible form.

2. The apparatus of claim 1, wherein said second image data is generated by converting a resolution of said first image data.

3. The apparatus of claim 1, wherein said predetermined image size is smaller than the image size of said first image data.

4. The apparatus of claim 1, wherein a resolution of said second image data is lower than that of said first image data.

5. The apparatus of claim 1, wherein said various types of inputting devices include a film-scanner for inputting said image data from a transmission-type original and/or a reflection-type scanner for inputting said image data from a reflection type original.

6. The apparatus of claim 5, wherein said film-scanner inputs a preliminary-scanned image data before inputting a main-scanned image data and said data generator generates said conditional data based on said preliminary-scanned image data to process said main-scanned image data by means of said second image processor.

7. The apparatus of claim 1, wherein said image outputting device comprises a printing device for reproducing said image in visible form.

8. The apparatus of claim 7, wherein said printing device records said image on a photosensitive material based on said third image data.

9. The apparatus of claim 1, wherein said image outputting device comprises a display device for reproducing said image in visible form.

10. The apparatus of claim 1, wherein said data generator comprises an adjusting means for adjusting color and/or density of said second image data.

11. The apparatus of claim 10, wherein said data generator comprises a memory for storing an adjusting result by said adjusting means as said conditional data.

12. The apparatus of claim 10, wherein said image outputting device comprises a display device for reproducing said image in visible form so as to allow the adjustment of the color and/or density.

13. The apparatus of claim 12, wherein said image outputting device further outputs a plurality of images in the predetermined image size, said predetermined image size being independent of the image size of said first image data and irrespective of types of said media.

14. The apparatus of claim 1, further comprising:
   a memory for storing said conditional data generated by said data generator, wherein said second image processor generates third image data based on said conditional data stored in the memory.

15. A method for reproducing an image based on image data inputted from various types of media, comprising:
   inputting said image data as a first image data;
   generating a second image data from said first image data by converting an image size of said first image data into a predetermined image size of said second of said media, while said predetermined image size of said second image data is a constant image size being independent of the image size of said first image data and irrespective of types of said media;
   generating conditional data for adjusting a quality of said image based on said second image data;
   generating a third image data by processing either said first image data or said second image data based on said conditional data; and
   reproducing said image based on said third image data.

16. The method of claim 15, wherein said second image data is generated by converting a resolution of said first image data.

17. The method of claim 15, wherein said predetermined image size is smaller than said image size of said first image data.

18. The method of claim 16, wherein a resolution of said second image data is lower than that of said first image data.

19. The method of claim 15, wherein said predetermined image size is a constant image size irrespective of a type of apparatus by which said first image data is generated.

* * * * *

UNITED STATES PATENT AND TRADEMARK OFFICE
CERTIFICATE OF CORRECTION

PATENT NO.   : 6,222,613 B1                                                       Page 1 of 1
DATED        : April 24, 2001
INVENTOR(S)  : Tsuyoshi Haraguchi et al.

It is certified that error appears in the above-identified patent and that said Letters Patent is hereby corrected as shown below:

<u>Column 14,</u>
Line 32, after "of said second", insert -- image data, wherein the image size of said first image data varies depending on types --.

Signed and Sealed this

Fifteenth Day of July, 2003

JAMES E. ROGAN
*Director of the United States Patent and Trademark Office*